United States Patent
Suzuki

(10) Patent No.: US 11,984,308 B2
(45) Date of Patent: May 14, 2024

(54) METHOD FOR MEASURING CONCENTRATION OF FLUORINE GAS IN HALOGEN FLUORIDE-CONTAINING GAS USING MASS SPECTROMETER

(71) Applicant: SHOWA DENKO K.K., Tokyo (JP)

(72) Inventor: Atsushi Suzuki, Tokyo (JP)

(73) Assignee: Resonac Corporation, Tokyo (JP)

( * ) Notice: Subject to any disclaimer, the term of this patent is extended or adjusted under 35 U.S.C. 154(b) by 365 days.

(21) Appl. No.: 17/608,527

(22) PCT Filed: Nov. 12, 2020

(86) PCT No.: PCT/JP2020/042274
§ 371 (c)(1),
(2) Date: Nov. 3, 2021

(87) PCT Pub. No.: WO2021/106601
PCT Pub. Date: Jun. 3, 2021

(65) Prior Publication Data
US 2022/0223397 A1    Jul. 14, 2022

(30) Foreign Application Priority Data
Nov. 27, 2019 (JP) .................. 2019-214260

(51) Int. Cl.
*H01J 49/04* (2006.01)
*H01J 49/00* (2006.01)
*H01J 49/40* (2006.01)

(52) U.S. Cl.
CPC ...... *H01J 49/0422* (2013.01); *H01J 49/0031* (2013.01); *H01J 49/40* (2013.01)

(58) Field of Classification Search
CPC .... H01J 49/0422; H01J 49/0031; H01J 49/40; G01N 27/62; G01N 27/623; G01N 33/0018; C01B 7/19; C01B 7/24
(Continued)

(56) References Cited

U.S. PATENT DOCUMENTS

| 5,447,053 A | 9/1995 | Ohmi |
| 6,686,594 B2 | 2/2004 | Ji et al. |

(Continued)

FOREIGN PATENT DOCUMENTS

| CN | 102879492 A | 1/2013 |
| CN | 109888599 A | 6/2019 |

(Continued)

OTHER PUBLICATIONS

"Selection of Stainless Steels for Handling Hydrofluoric Acid (HF)", British Stainless Steel Association, Retrieved on Oct. 20, 2022, <https://bssa.org_uk/bssa_articles/selection-of-stainless-steels-for-handling-hydrofluoric-acid-hf> (2 pages total).

(Continued)

*Primary Examiner* — Kiet T Nguyen
(74) *Attorney, Agent, or Firm* — Sughrue Mion, PLLC

(57) ABSTRACT

A method for measuring the concentration of fluorine gas ($F_2$) contained in a halogen fluoride-containing gas using an analysis apparatus having a halogen fluoride-containing gas supply source, a fluorine-containing gas supply source, a tube, a capillary, and a mass spectrometer, the method including, before measuring the concentration of fluorine gas, performing passivation treatment on the tube and the capillary using a passivation gas containing a fluorine-containing gas supplied from the fluorine-containing gas supply source.

9 Claims, 1 Drawing Sheet

(58) Field of Classification Search
USPC .................................................. 250/281, 282
See application file for complete search history.

(56) References Cited

U.S. PATENT DOCUMENTS

| | | | |
|---|---|---|---|
| 7,179,653 | B2 | 2/2007 | Ohno et al. |
| 10,899,615 | B2 | 1/2021 | Takahashi et al. |
| 2002/0051132 | A1 | 5/2002 | Ohno et al. |
| 2005/0115674 | A1 | 6/2005 | Taguchi et al. |
| 2009/0148348 | A1* | 6/2009 | Pettigrew .................. C08J 7/12 427/2.11 |
| 2019/0055124 | A1 | 2/2019 | Takahashi et al. |

FOREIGN PATENT DOCUMENTS

| | | |
|---|---|---|
| EP | 0 651 247 A1 | 5/1995 |
| EP | 3 900 810 A1 | 10/2021 |
| JP | 4-353761 A | 12/1992 |
| JP | 7-307301 A | 11/1995 |
| JP | 2005-241249 A | 9/2005 |
| JP | 2018-107438 A | 7/2018 |
| TW | 493069 B | 7/2002 |
| TW | 202032121 A | 9/2020 |
| WO | 2017/175644 A1 | 10/2017 |
| WO | 2017/179458 A1 | 10/2017 |

OTHER PUBLICATIONS

International Search Report dated Feb. 2, 2021 in International Application No. PCT/JP2020/042274.
Written Opinion of the International Searching Authority dated Feb. 2, 2021 in International Application No. PCT/JP2020/042274.
Communication dated Sep. 13, 2021 from the Taiwanese Patent Office in corresponding Taiwanese Application No. 109140922.
Laura Mendicino et al., "Remote Plasma Clean Technology for Dielectric CVD Chamber Cleaning to Reduce PFC Emissions", Electrochemical Society Proceedings, 1999, vol. 99-8, pp. 40-51 (16 pages total).
Law, et al., "The Catalyst Handbook", Beijing Golden Press, Aug. 2008, p. 277, with a machine translation of Office Action dated Nov. 18, 2023, issued for corresponding CN patent application No. 202080032719.7 (11 pages).
Wanghui Wei, et al., "Qualitation and Quantitation of Trace Fluoride in Electronic Grade Gas by Gas Chromatography-Mass Spectrometry", Low Temperature and Specialty Gases, Oct. 2019, vol. 37, No. 5, 35-40 (6 pages).
Richard D. Chambers, et al., "Part 11 [1]. Fluorination of modified ethers and polyethers", Journal of Fluorine Chemistry, 2000, vol. 101, 97-105 (9 pages).

* cited by examiner

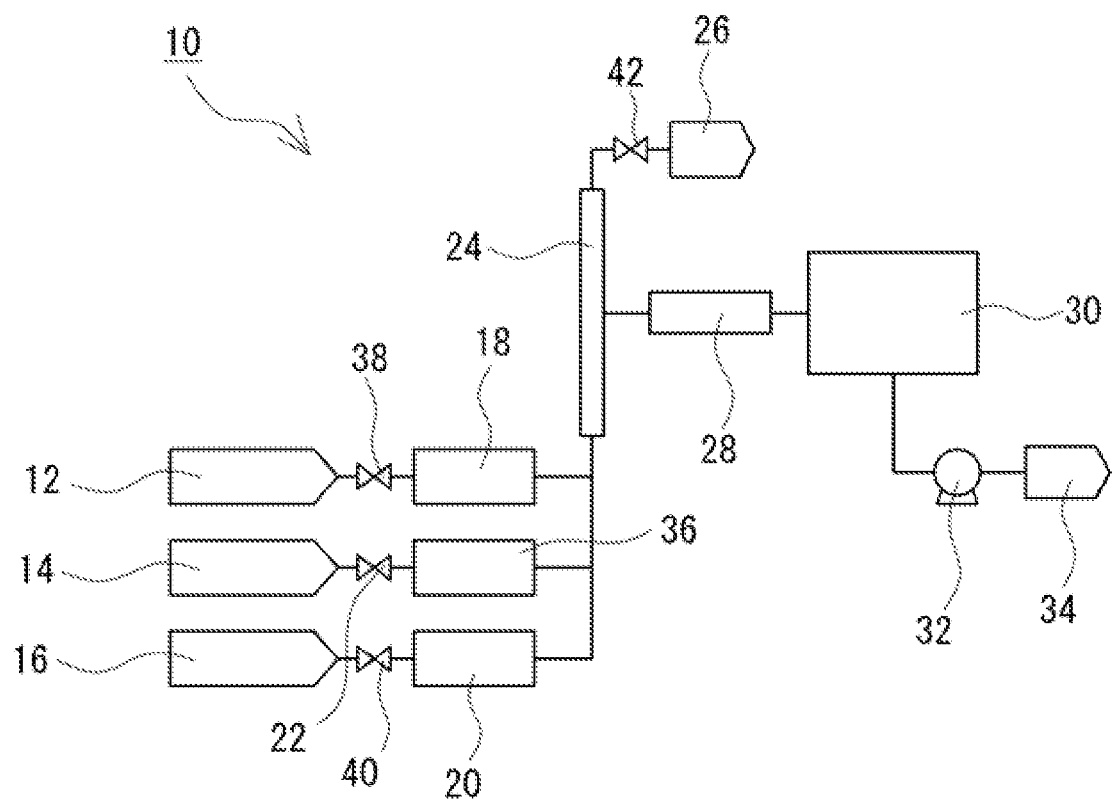

METHOD FOR MEASURING
CONCENTRATION OF FLUORINE GAS IN
HALOGEN FLUORIDE-CONTAINING GAS
USING MASS SPECTROMETER

CROSS REFERENCE TO RELATED
APPLICATIONS

This application is a National Stage of International Application No. PCT/JP2020/042274 filed Nov. 12, 2020, claiming priority based on Japanese Patent Application No. 2019-214260 filed Nov. 27, 2019.

TECHNICAL FIELD

The present invention relates to a method for measuring the concentration of fluorine gas contained in a halogen fluoride-containing gas.

BACKGROUND ART

Halogen fluorides are used in for example etching gas and cleaning gas in semiconductor manufacturing processes. In recent years, the miniaturization of semiconductors is in progress, and it is required that etching gas and cleaning gas for example used in semiconductor manufacturing processes be high-purity gas. To prepare high-purity gas, a method for measuring the concentration of fluorine gas, which is an impurity, contained in etching gas and cleaning gas for example with good accuracy is needed.

As a method for measuring the concentration of fluorine gas, for example, Non-Patent Literature 1 discloses a method in which a quadrupole mass spectrometer is used to measure the concentrations of $F_2$, $NF_3$, and $SiF_4$ generated when a semiconductor manufacturing process apparatus is cleaned with $NF_3$ gas.

Further, Patent Literature 1 discloses a method in which halogen gas generated from a semiconductor manufacturing process is analyzed by ultraviolet-visible absorption spectroscopy. In this method, Patent Literature 1 discloses that a metal that has been subjected to passivation treatment with fluorine gas is used as a member included in a sample cell that a gas to be measured is to be introduced into and that is to be irradiated with UV-visible light. On the other hand, fluorine gas measurement using a mass spectrometer needs to be performed in a high vacuum environment; hence, Patent Literature 1 gives problems for where a vacuum pump used is to be installed and the time for setup of the vacuum pump, problems of corrosion on components such as an ion source, a detector, and a pump, and other problems, and suggests that the use of a mass spectrometer is not suitable for measurement of the concentration of fluorine gas.

CITATION LIST

Patent Literature

Patent Literature 1: U.S. Pat. No. 6,686,594 B2

Non-Patent Literature

Non-Patent Literature 1: Electrochemical Society Proceedings, Volume 99-8, pp. 40-51

SUMMARY OF INVENTION

Technical Problem

When measuring the concentration of fluorine gas by using a mass spectrometer, since the reactivity of fluorine gas ($F_2$) is very high, fluorine gas reacts with metal members such as a tube and a capillary in the gas passage and minute amounts of impurities such as water in the passage. Hence, fluorine gas which is to be measured is consumed because of such reactions in the gas passage, and this is a cause of measurement errors when measuring the concentration of fluorine gas.

Thus, an object of the present invention is to provide a high-accuracy measurement method that, in the measurement of the concentration of fluorine gas contained in a halogen fluoride-containing gas using a mass spectrometer, reduces the amount of measurement errors that are caused by consumption of fluorine gas due to reactions with metal members such as a tube and a capillary and impurities on the gas passage.

Solution to Problem

The present inventor and others conducted extensive studies in order to solve the issue mentioned above, and have found out that high-accuracy measurement can be made by, before measuring the concentration of fluorine gas contained in a halogen fluoride-containing gas by using a mass spectrometer, subjecting a tube and a capillary existing in a gas passage in an analysis apparatus to passivation treatment with a fluorine-containing gas in advance to form fluorine-based passive films in the interiors of the tube and the capillary, and removing internal impurities, and thus have completed the present invention. That is, the present invention includes [1] to [9] shown below.

[1] A method for measuring a concentration of fluorine gas ($F_2$) contained in a halogen fluoride-containing gas by using an analysis apparatus having a halogen fluoride-containing gas supply source, a fluorine-containing gas supply source, a tube, a capillary, and a mass spectrometer, the method comprising, before measuring the concentration of fluorine gas, performing passivation treatment on the tube and the capillary by using a passivation gas containing a fluorine-containing gas supplied from the fluorine-containing gas supply source.

[2] The method for measuring a concentration of fluorine gas according to [1], in which the fluorine-containing gas is at least one kind of gas selected from the group consisting of $F_2$, HF, $NF_3$, $SF_6$, and a halogen fluoride.

[3] The method for measuring a concentration of fluorine gas according to [1] or [2], in which a temperature used to perform the passivation treatment is 70 to 500° C.

[4] The method for measuring a concentration of fluorine gas according to any one of [1] to [3], in which time to perform the passivation treatment is 1 to 5 hours.

[5] The method for measuring a concentration of fluorine gas according to any one of [1] to [4], in which a concentration of the fluorine-containing gas in the passivation gas is 8 to 100 volume %.

[6] The method for measuring a concentration of fluorine gas according to [5], in which the analysis apparatus further has a diluent gas supply source, and adjusts the concentration of the fluorine-containing gas in the passivation gas by using a diluent gas supplied from the diluent gas supply source.

[7] The method for measuring a concentration of fluorine gas according to [5] or [6], in which the diluent gas is at least one selected from helium, argon, nitrogen gas ($N_2$), carbon dioxide, and carbon tetrafluoride.

[8] The method for measuring a concentration of fluorine gas according to any one of [1] to [7], in which a halogen fluoride contained in the halogen fluoride-containing gas is at least one selected from the group consisting of chlorine fluoride, chlorine trifluoride, bromine fluoride, bromine trifluoride, bromine pentafluoride, iodine fluoride, iodine trifluoride, iodine pentafluoride, and iodine heptafluoride.

[9] An apparatus for measuring a concentration of fluorine gas, the apparatus comprising a halogen fluoride-containing gas supply source, a fluorine-containing gas supply source, a tube, a capillary, and a mass spectrometer, in which the tube and the capillary have been subjected to passivation treatment with a passivation gas containing a fluorine-containing gas supplied from the fluorine-containing gas supply source.

Advantageous Effects of Invention

According to the present invention, high-accuracy measurement can be made for the concentration of fluorine gas contained in a halogen fluoride-containing gas.

BRIEF DESCRIPTION OF DRAWINGS

The FIGURE is a schematic diagram of an example of an analysis apparatus used for measurement of the concentration of fluorine gas of the present invention.

DESCRIPTION OF EMBODIMENTS

Hereinbelow, one embodiment of the present invention is described in detail with reference to the FIGURE. The analysis apparatus used in the present invention is not limited to the analysis apparatus shown in the FIGURE. The one embodiment of the present invention is a method for measuring the concentration of fluorine gas (F2) contained in a halogen fluoride-containing gas by using an analysis apparatus 10 having a halogen fluoride-containing gas supply source 16, a fluorine-containing gas supply source 14, a tube 24, a capillary 28, and a mass spectrometer 30, and the embodiment, before measuring the concentration of fluorine gas, performs passivation treatment using a fluorine-containing gas on the tube 24 and the capillary 28 (hereinafter, also referred to as "the tube and others").

<Analysis Apparatus 10>

(Halogen Fluoride-Containing Gas Supply Source 16)

The halogen fluoride-containing gas supply source 16 included in the analysis apparatus 10 used for an embodiment of the present invention supplies a halogen fluoride-containing gas that contains fluorine gas, which is to be measured. The supply method, form, size, for example, of the halogen fluoride-containing gas supply source 16 are not particularly limited as long as a halogen fluoride-containing gas can be supplied to the tube and others and the mass spectrometer 30 described later. For example, a halogen fluoride-containing gas may be supplied to the tube 24 described later from a branch pipe branched from a halogen fluoride-containing gas supply pipe connected to an etching apparatus used in a semiconductor manufacturing process via a valve 40, or may be supplied to the tube 24 from a container such as a gas cylinder in which the same halogen fluoride-containing gas as the gas supplied to an etching apparatus is retained. A configuration in which the halogen fluoride-containing gas supply source 16 is connected to the tube 24 via a flow rate control device (mass flow controller, MFC) 20 is preferable in terms of regulating the flow rate of the halogen fluoride-containing gas sent from the halogen fluoride-containing gas supply source 16 to facilitate the adjustment of the concentration of fluorine gas contained in the halogen fluoride-containing gas at the time of measurement with the mass spectrometer 30.

The halogen fluoride contained in the halogen fluoride-containing gas is a fluorine compound containing a halogen such as chlorine, bromine, or iodine as a constituent element. Examples of the halogen fluoride include chlorine fluoride, chlorine trifluoride, bromine fluoride, bromine trifluoride, bromine pentafluoride, iodine fluoride, iodine trifluoride, iodine pentafluoride, and iodine heptafluoride. Among these, in terms of the frequency of use, chlorine trifluoride, bromine trifluoride, bromine pentafluoride, iodine pentafluoride, and iodine heptafluoride are preferable, and chlorine trifluoride, iodine heptafluoride, and bromine pentafluoride can be used for the present invention more favorably. In the halogen fluoride-containing gas, one kind of halogen fluoride may be contained singly, or a plurality of kinds may be contained.

Fluorine gas, which is to be measured, and impurity gases other than fluorine gas may be contained in the halogen fluoride-containing gas supplied from the halogen fluoride-containing gas supply source 16. Examples of impurity gases include helium, argon, oxygen gas ($O_2$), nitrogen gas ($N_2$), carbon dioxide, and carbon tetrafluoride. One single kind or a plurality of kinds of impurity gas may be contained in the halogen fluoride-containing gas, and the amount of impurity gas contained is not particularly limited.

(Fluorine-Containing Gas Supply Source 14)

The fluorine-containing gas supply source 14 included in the analysis apparatus used for an embodiment of the present invention supplies a fluorine-containing gas used to subject the tube and others described later to passivation treatment described later. The supply method, form, size, for example, of the fluorine-containing gas supply source 14 are not particularly limited as long as the fluorine-containing gas supply source 14 can supply a fluorine-containing gas to the tube and others. For example, a passivation gas containing a fluorine-containing gas may be supplied to the tube 24 from a gas cylinder in which a fluorine-containing gas is retained, or from a gas cylinder in which a fluorine-containing gas is retained and a container such as a gas cylinder in which a diluent gas is retained, with both gasses caused to flow together. Also, a fluorine generation apparatus may be used as the fluorine-containing gas supply source 14.

The fluorine-containing gas is a gas containing the fluorine element as a constituent element, and is not particularly limited as long as passivation treatment can be performed. Examples of the fluorine-containing gas include $F_2$, HF, $NF_3$, $SF_6$, and a halogen fluoride. Among these, in terms of the ease of formation of a passive film, $F_2$ and a halogen fluoride are preferable, and $F_2$ is more preferable. As the fluorine-containing gas, one kind may be used singly, or a plurality of kinds may be used.

A configuration in which the fluorine-containing gas supply source 14 is connected to the tube 24 via a flow rate control device 36 is preferable in terms of regulating the flow rate of the fluorine-containing gas supplied from the fluorine-containing gas supply source 14 to facilitate the adjustment of the concentration of the fluorine-containing gas at the time of passivation treatment. It is preferable to provide a valve 22 between the fluorine-containing gas supply source 14 and the flow rate control device 36.

(Diluent Gas Supply Source 12)

The analysis apparatus 10 used in an embodiment of the present invention preferably has a diluent gas supply source 12. The diluent gas supplied from the diluent gas supply source 12 is preferably used for dilution of the fluorine-containing gas in the passivation gas and dilution of the halogen fluoride-containing gas to be measured in the mass spectrometer 30. The supply method, form, size, for example, of the diluent gas supply source 12 are not particularly limited as long as the diluent gas supply source 12 can supply a diluent gas to the tube and others and the mass spectrometer 30. For example, a diluent gas may be supplied to the tube 24 from a container such as a gas cylinder in which the diluent gas is retained.

The diluent gas is a gas inert to the halogen fluoride, the fluorine-containing gas, and the impurity gas mentioned above. Examples of the diluent gas include helium, argon, $N_2$, carbon dioxide, and carbon tetrafluoride. Among these, helium and $N_2$ are preferable in terms of having large differences in molecular weight from $F_2$ and providing good analysis accuracy, and $N_2$ is more preferable.

A configuration in which the diluent gas supply source 12 is connected to the tube 24 via a flow rate control device 18 is preferable in terms of regulating the flow rate of the diluent gas supplied from the diluent gas supply source 12 to facilitate the adjustment of the concentration of fluorine gas contained in the halogen fluoride-containing gas at the time of measurement with the mass spectrometer 30 and the concentration of the fluorine-containing gas at the time of passivation treatment. It is preferable to provide a valve 38 between the diluent gas supply source 12 and the flow rate control device 18.

Tube 24 and Capillary 28:

The tube 24 included in the analysis apparatus 10 used for an embodiment of the present invention is a pipe for a gas passage that connects a series of gas supply sources, namely the halogen fluoride-containing gas supply source 16, the fluorine-containing gas supply source 14, and preferably the diluent gas supply source 12 mentioned above, and the capillary 28 described later, and is used to introduce a halogen fluoride-containing gas, a fluorine-containing gas, and preferably a diluent gas into the capillary 28. The inner diameter of the tube 24 may be set in accordance with the flow rate of gas, as appropriate, and is preferably 3 to 50 mm, and more preferably 6 to 25 mm.

The halogen fluoride-containing gas supply source 16, the fluorine-containing gas supply source 14, and preferably the diluent gas supply source 12 mentioned above are connected to the tube 24. The connection part is not particularly limited, but it is preferable that connection be performed such that passivation treatment can be sufficiently performed on the tube 24. The tube 24 may have a valve 42 and an outlet 26 for discharging for example the fluorine-containing gas after passivation treatment.

The capillary 28 included in the analysis apparatus 10 used for an embodiment of the present invention is a pipe for a gas passage that connects the tube 24 mentioned above and the mass spectrometer 30 described later, and is used to adjust the amount of the halogen fluoride-containing gas introduced into the mass spectrometer 30. The passage cross-sectional area of the capillary 28 is smaller than that of the tube 24; the inner diameter of the capillary 28 may be set in accordance with the flow rate of gas, as appropriate, and is preferably 0.1 to 5 mm, and more preferably 1 to 2 mm.

The material of the tube and the capillary is not particularly limited as long as the material has corrosion resistance to the components contained in the halogen fluoride-containing gas and the fluorine-containing gas and heat resistance to heating at the time of passivation treatment. Examples of the material of the tube and others include stainless steel, nickel, Inconel, and Monel.

(Mass Spectrometer 30)

The mass spectrometer 30 included in the analysis apparatus 10 used for an embodiment of the present invention is used to measure the concentration of fluorine gas contained in the halogen fluoride-containing gas. The mass spectrometer 30 is not particularly limited as long as the mass spectrometer 30 is capable of quantitative analysis for a one-component gas or a mixed gas of a plurality of minor components, and a mixed gas of a single minor component or a plurality of minor components and a single major component or a plurality of major components. Examples of the mass spectrometer 30 include a quadrupole mass spectrometer, a double-focusing mass spectrometer, an ion trap mass spectrometer, a time-of-flight mass spectrometer, and an ion cyclotron mass spectrometer. The mass spectrometer 30 may include a vacuum pump 32 and an outlet 34.

<Passivation Treatment>

(Treatment Method)

In an embodiment of the present invention, the passivation treatment refers to a treatment that forms passive films of fluorine on the interior surface of the tube and others by using the passivation gas containing a fluorine-containing gas mentioned above, and impurities such as water are removed simultaneously. The passivation gas is a gas that is used for passivation treatment and that contains a fluorine-containing gas or a fluorine-containing gas diluted with the diluent gas mentioned above (a mixed gas). The passivation treatment may be performed in a state where a passivation gas is enclosed in the interiors of the tube and others by closing the valve 26 arbitrarily provided at the tube and others, or may be performed by distributing the passivation gas mentioned above to the tube and others while keeping the valve 26 open. The flow rate in the case where the passivation gas mentioned above is distributed may be set in accordance with the time and temperature for performing passivation treatment and the inner diameters of the tube and others, as appropriate; for example, when the inner diameter of the tube 24 is 3 to 8 mm and the inner diameter of the capillary 28 is 0.5 to 1.5 mm, the total flow rate of the fluorine-containing gas and the diluent gas is 40 to 60 mL/minute. As long as a treatment that brings about a change to the interior surface of the tube and others, such as opening the interiors of the tube and others to the outside air, is not performed, the passivation treatment does not need to be implemented repeatedly; however, from the viewpoint of performing measurement stably, the passivation treatment may be performed periodically, such as once a day, once a month, or once a year.

(Temperature)

The temperature used to perform passivation treatment is preferably higher than the temperature when measuring the concentration of fluorine gas contained in the halogen fluoride-containing gas; specifically, the temperature is preferably 70 to 500° C. If the temperature used to perform passivation treatment is lower than the lower limit value of the range mentioned above, the formation of a passive film of fluorine is insufficient, and fluorine in the halogen fluoride is consumed in the tube and others; hence, measurement accuracy may be reduced. If the temperature used to perform passivation treatment is higher than the upper limit value of the range mentioned above, there may be a case where the passive films of fluorine are peeled off and the metal surfaces of the tube and others are corroded. The temperature when performing passivation treatment is more preferably 80 to 400° C., and still more preferably 100 to 300° C.
(Time)

The time to perform passivation treatment is preferably 1 to 5 hours. If the time to perform passivation treatment is shorter than the lower limit value of the range mentioned above, the formation of a passive film is insufficient, and fluorine in the halogen fluoride is consumed in the tube and others; hence, measurement accuracy may be reduced. If the time to perform passivation treatment is longer than the range mentioned above, the proportion of the effect to the treatment time may be small. The time to perform passivation treatment is more preferably 2 to 4 hours.
(Concentration of the Fluorine-Containing Gas)

The concentration of the fluorine-containing gas in the passivation gas when performing passivation treatment is preferably 8 to 100 volume %. The diluent gas described above is preferably used as a gas that is not the fluorine-containing gas in the passivation gas. If the concentration of the fluorine-containing gas is lower than the lower limit value of the range mentioned above, the formation of a passive film of fluorine is insufficient, and fluorine in the halogen fluoride is consumed in the tube and others; hence, measurement accuracy may be reduced. The concentration of the fluorine-containing gas in the passivation gas when performing passivation treatment is more preferably 10 to 100 volume %, still more preferably 30 to 100 volume %, and particularly preferably 50 to 100 volume %. Further, the concentration of the fluorine-containing gas when performing passivation treatment is preferably equal to or more than the concentration of the halogen fluoride contained in the halogen fluoride-containing gas, and is preferably higher than the concentration of fluorine gas when measuring the concentration of fluorine gas contained in the halogen fluoride-containing gas.

The adjustment of the concentration of the fluorine-containing gas in the passivation gas may be performed by adjusting the flow rate of each of the gases supplied from the fluorine-containing gas supply source 14 and the diluent gas supply source 12. For example, when setting the concentration of the fluorine-containing gas in the passivation gas to 70 volume % of the concentration of the fluorine-containing gas of the fluorine containing gas supply source 14, the flow rate of each gas is regulated so that the ratio between the flow rate of the fluorine-containing gas supplied from the fluorine containing gas supply source 14 and the flow rate of the diluent gas supplied from the diluent gas supply source 12 is 7:3 under equal pressure.
(Measurement of the Concentration of Fluorine Gas)

For the measurement of the concentration of fluorine gas contained in the halogen fluoride-containing gas, first, the passivation treatment mentioned above is performed, the fluorine-containing gas is sufficiently removed from the tube 24, the capillary 28, and the mass spectrometer 30, preventing thereafter the fluorine-containing gas from being supplied from the fluorine-containing gas supply source 14. Next, a halogen fluoride-containing gas is supplied to the tube and others from the halogen fluoride-containing gas supply source 16, is diluted with a diluent gas as necessary, and is introduced into the mass spectrometer 30 to measure the concentration of fluorine gas contained in the halogen fluoride-containing gas.

The halogen fluoride-containing gas at the time of measurement with the mass spectrometer 30 preferably has been diluted to 1 to 90 volume %, more preferably has been diluted to 5 to 70 volume %, and still more preferably has been diluted to 10 to 50 volume %, by using a diluent gas.

The dilution of the halogen fluoride-containing gas mentioned above is performed by adjusting the flow rate of each of the gases supplied from the halogen fluoride gas supply source 16 and the diluent gas supply source 12. For example, when diluting the halogen fluoride-containing gas to 40 volume %, the flow rate of each gas is regulated so that the ratio between the flow rate of the halogen fluoride gas supplied from the halogen fluoride gas supply source 16 and the flow rate of the diluent gas supplied from the diluent gas supply source 12 is 4:6 under equal pressure, and a mixed gas of the halogen fluoride-containing gas and the diluent gas is prepared.

The halogen fluoride-containing gas supplied from the halogen fluoride-containing gas supply source 16, or the mixed gas of the halogen fluoride-containing gas and the diluent gas adjusted in the above manner is introduced into the mass spectrometer 30 through the tube 24 and the capillary 28. The concentration of fluorine gas contained in the halogen fluoride-containing gas is measured in conformity with a manual of the mass spectrometer 30 used.

EXAMPLES

Hereinbelow, the present invention is described still more specifically on the basis of Examples; however, the present invention is not limited to these Examples.

Example 1

Chlorine trifluoride gas was used as the halogen fluoride-containing gas, and F2 was used as the fluorine-containing gas in the passivation gas; using the analysis apparatus 10 shown in the FIGURE, the concentration of fluorine gas contained in the chlorine trifluoride gas was measured in conformity with the measurement method of the present invention. A tube made of SUS 316 and having an inner diameter of 6 mm was used as the tube 24 included in the analysis apparatus 10. A capillary made of SUS 316 and having an inner diameter of 1 mm was used as the capillary 28. A quadrupole mass spectrometer (HPR-20, manufactured by Hiden Analytical Ltd.) was used as the mass spectrometer 30, and the concentration of fluorine gas was measured in conformity with a manual that came with the product.

$F_2$ with the flow rate adjusted to 50 mL/minute was supplied to the tube and others from an $F_2$ cylinder, which is the fluorine-containing gas supply source 14 for passivation treatment, via the flow rate control device 36 (product name: Digital Mass Flow Controller SEC-N100, manufactured by HORIBA STEC, Co., Ltd.). Further, $N_2$ was used as a diluent gas; $N_2$ with the flow rate adjusted to 50 mL/minute was supplied to the tube and others from an $N_2$ cylinder, which is the diluent gas supply source 12, via the flow rate control device 18 (product name: Digital Mass Flow Controller SEC-N100, manufactured by HORIBA STEC, Co., Ltd.). In a state where both gases were being supplied to the tube 24 at the flow rates mentioned above, the tube 24 and the capillary 28 were heated at 200° C. for 3 hours to subject the interiors of the tube and others to passivation treatment with a mixed gas (1) of $F_2$ and $N_2$, which is the passivation gas.

The gas supply from the $F_2$ cylinder and the $N_2$ cylinder to the tube and others was stopped to end the passivation treatment. The mixed gas (1) mentioned above was discharged from the tube and others by opening the outlet 26 and was then replaced with $N_2$, the outlet 26 was closed, and the passivation gas in the tube and the capillary was sufficiently discharged with the vacuum pump 32; then, a mixed gas (2) of chlorine trifluoride gas and $N_2$ with the flow rates adjusted individually to 50 mL/minute was supplied to the tube and others from a chlorine trifluoride gas cylinder, which is the halogen fluoride-containing gas supply source 16, and an $N_2$ cylinder, which is the diluent gas supply source 12, via the flow rate control device 20 (product name: Digital Mass Flow Controller SEC-N100, manufactured by HORIBA STEC, Co., Ltd.) and the flow rate control device 18, and the concentration of fluorine gas in the chlorine trifluoride gas that had been diluted to 50 volume % with $N_2$ under the condition of 25° C. was measured with the mass spectrometer 30. As a result, it was found that the concentration of fluorine gas after dilution with $N_2$ was 4 volume ppm. Therefore, the concentration of fluorine gas contained in the chlorine trifluoride gas supplied from the chlorine trifluoride-containing gas supply source 16 before dilution with $N_2$ was 8 volume ppm.

Example 2

The concentration of fluorine gas was measured similarly to Example 1 except that, as the halogen fluoride-containing gas, the chlorine trifluoride gas was replaced with iodine heptafluoride gas. As a result, it was found that the concentration of fluorine gas contained in the iodine heptafluoride gas supplied from the halogen fluoride-containing gas supply source 16 was 6 volume ppm.

Example 3

The concentration of fluorine gas was measured similarly to Example 1 except that, as the halogen fluoride-containing gas, the chlorine trifluoride gas was replaced with bromine pentafluoride gas. As a result, it was found that the concentration of fluorine gas contained in the bromine pentafluoride gas supplied from the halogen fluoride-containing gas supply source 16 was 10 volume ppm.

Comparative Example 1

The concentration of fluorine gas contained in chlorine trifluoride gas was measured similarly to Example 1 except that passivation treatment was not implemented; fluorine gas was not detected.

Examples 4 to 9

The concentration of fluorine gas contained in chlorine trifluoride gas was measured similarly to Example 1 except that the temperature condition at the time of passivation treatment was set to the temperatures written in Table 1 below. The results of the concentration of fluorine gas contained in the chlorine trifluoride gas supplied from the halogen fluoride-containing gas supply source 16 are shown in Table 1.

TABLE 1

| | Temperature at passivation treatment (° C.) | Fluorine gas concentration (volume ppm) |
|---|---|---|
| Example 1 | 200 | 8 |
| Example 4 | 150 | 8 |
| Example 5 | 120 | 8 |
| Example 6 | 100 | 8 |
| Example 7 | 80 | 8 |

TABLE 1-continued

| | Temperature at passivation treatment (° C.) | Fluorine gas concentration (volume ppm) |
|---|---|---|
| Example 8 | 60 | 1 |
| Example 9 | 40 | 1 |
| Comparative example 1 | No passivation treatment | Not detected |

Examples 10 to 15

The concentration of fluorine gas contained in chlorine trifluoride gas before being diluted was obtained similarly to Example 1 except that the concentration of $F_2$ used for passivation treatment was set to the concentrations shown in Table 2 below. The results are shown in Table 2. In Example 10, the dilution of $F_2$ with $N_2$ was not performed at the time of passivation treatment, and thus the measurement value of the concentration of fluorine gas is shown in Table 2 as is.

TABLE 2

| | $F_2$ concentration at passivation treatment (volume %) | Fluorine gas concentration (volume ppm) |
|---|---|---|
| Example 1 | 50 | 8 |
| Example 10 | 100 | 8 |
| Example 11 | 70 | 8 |
| Example 12 | 30 | 8 |
| Example 13 | 10 | 8 |
| Example 14 | 5 | 1 |
| Example 15 | 1 | 1 |
| Comparative example 1 | No passivation treatment | Not detected |

REFERENCE SIGNS LIST

10 analysis apparatus
12 diluent gas supply source
14 fluorine-containing gas supply source
16 halogen fluoride-containing gas supply source
18, 20, 36 flow rate control device
22, 38, 40, 44 valve
24 tube
26 outlet
28 capillary
30 mass spectrometer
32 vacuum pump
34 outlet

The invention claimed is:

1. A method for measuring a concentration of fluorine gas (F2) contained in a halogen fluoride-containing gas by using an analysis apparatus having a halogen fluoride-containing gas supply source, a fluorine-containing gas supply source, a tube, a capillary, and a mass spectrometer,
   the method comprising:
   before measuring the concentration of fluorine gas, performing passivation treatment on the tube and the capillary by using a passivation gas containing a fluorine-containing gas supplied from the fluorine-containing gas supply source.

2. The method for measuring a concentration of fluorine gas according to claim 1, wherein
   the fluorine-containing gas is at least one kind of gas selected from the group consisting of $F_2$, HF, $NF_3$, $SF_6$, and a halogen fluoride.

3. The method for measuring a concentration of fluorine gas according to claim 1, wherein
a temperature used to perform the passivation treatment is 70 to 500° C.

4. The method for measuring a concentration of fluorine gas according to claim 1, wherein
time to perform the passivation treatment is 1 to 5 hours.

5. The method for measuring a concentration of fluorine gas according to claim 1, wherein
a concentration of the fluorine-containing gas in the passivation gas is 8 to 100 volume %.

6. The method for measuring a concentration of fluorine gas according to claim 5, wherein
the analysis apparatus further has a diluent gas supply source, and adjusts the concentration of the fluorine-containing gas in the passivation gas by using a diluent gas supplied from the diluent gas supply source.

7. The method for measuring a concentration of fluorine gas according to claim 6, wherein
the diluent gas is at least one selected from helium, argon, nitrogen gas ($N_2$), carbon dioxide, and carbon tetrafluoride.

8. The method for measuring a concentration of fluorine gas according to claim 1, wherein
a halogen fluoride contained in the halogen fluoride-containing gas is at least one selected from the group consisting of chlorine fluoride, chlorine trifluoride, bromine fluoride, bromine trifluoride, bromine pentafluoride, iodine fluoride, iodine trifluoride, iodine pentafluoride, and iodine heptafluoride.

9. An apparatus for measuring a concentration of fluorine gas, the apparatus comprising:
a halogen fluoride-containing gas supply source;
a fluorine-containing gas supply source;
a tube;
a capillary; and
a mass spectrometer,
wherein the tube and the capillary have been subjected to passivation treatment with a passivation gas containing a fluorine-containing gas supplied from the fluorine-containing gas supply source.

* * * * *